United States Patent [19]

Wunderatzke

[11] Patent Number: 4,946,310
[45] Date of Patent: Aug. 7, 1990

[54] DOME FOR WASTE DUMPS

[75] Inventor: Wilfried Wunderatzke, Cologne, Fed. Rep. of Germany

[73] Assignee: Akzo NV, Netherlands

[21] Appl. No.: 202,543

[22] Filed: Jun. 6, 1988

[30] Foreign Application Priority Data

Jun. 9, 1987 [DE] Fed. Rep. of Germany ....... 3719208

[51] Int. Cl.⁵ .............................................. B01D 29/15
[52] U.S. Cl. ................................ 405/128; 210/497.1; 210/497.2
[58] Field of Search .............. 210/494.1, 497.01, 497.1, 210/497.2; 405/128

[56] References Cited

U.S. PATENT DOCUMENTS

| 231,066 | 8/1880 | Long | 210/497.01 |
| 1,490,920 | 4/1924 | Godward | 210/494.1 |
| 3,112,262 | 11/1963 | Parkinson | 210/494.1 X |
| 3,186,552 | 6/1965 | Cutler | 210/497.01 X |
| 3,759,391 | 9/1973 | Dreher | 210/497.2 X |
| 3,807,570 | 4/1974 | Allan | 210/497.2 X |
| 4,048,075 | 9/1977 | Colvin et al. | 210/494.1 X |

FOREIGN PATENT DOCUMENTS

| 1810921 | 6/1970 | Fed. Rep. of Germany . |
| 2037831 | 2/1972 | Fed. Rep. of Germany . |
| 7137887 | 2/1972 | Fed. Rep. of Germany . |
| 7145370 | 4/1972 | Fed. Rep. of Germany . |
| 7241052 | 3/1973 | Fed. Rep. of Germany . |
| 7319981 | 11/1973 | Fed. Rep. of Germany . |
| 7424845 | 11/1974 | Fed. Rep. of Germany . |
| 2530499 | 1/1977 | Fed. Rep. of Germany . |
| 2702043 | 7/1977 | Fed. Rep. of Germany . |
| 2720403 | 11/1978 | Fed. Rep. of Germany . |
| 2606921 | 4/1979 | Fed. Rep. of Germany . |
| 3306665 | 7/1983 | Fed. Rep. of Germany . |
| 3313053 | 11/1984 | Fed. Rep. of Germany . |
| 3425784 | 1/1986 | Fed. Rep. of Germany . |
| 3425786 | 1/1986 | Fed. Rep. of Germany . |
| 3609973 | 10/1986 | Fed. Rep. of Germany . |
| 3533135 | 3/1987 | Fed. Rep. of Germany . |
| 2524351 | 10/1983 | France . |
| 0011363 | 3/1980 | Japan | 210/497.01 |
| WO8403450 | 9/1984 | PCT Int'l Appl. | 210/497.01 |

OTHER PUBLICATIONS

"Gas Erdgas-Deponiegasnutzung in der Bundesrepublik Deutschland", Verlag R.Oldenbourg Munchen, pp. 373–379, 124(1983) H.8.

"Grundlagen der Entgasungstechnik," Deponiegasforum, Munchen, pp. 1–22, Mar. 13, 1986.

"Deponieentgasung: Durchfuhrung eines Gaspumpversuches," Martin Butikofer and Enrico Cassina, pp. 651–655, 1984.

Primary Examiner—Dennis L. Taylor
Assistant Examiner—Arlen L. Olsen
Attorney, Agent, or Firm—Oliff & Berridge

[57] ABSTRACT

Dome for waste dumps with at least one outside filter layer and one draining and/or degassing area arranged within the outside filter layer, characterized in that the draining and/or degassing area is formed by at least one shaped body of plastic material, having a hollow space volume of at least 70% and that a continuous supporting tube is placed in the shaped body having a length corresponding to the height of the dome. These shaped bodies may consist of three-dimensionally shaped panels of plastic material or of a multitude of intersecting filaments of melt-spun polymers arranged in loops and having a filament diameter of at least 0.1 mm, and which are bonded to each other at their points of intersection. In a preferred embodiment of the invention, the supporting tube is coupled to a base plate. The shaped body may consist of a rolled-up mat, on which the filter layer is covered.

11 Claims, 4 Drawing Sheets

DOME FOR WASTE DUMPS

TECHNICAL FIELD

The invention relates to domes for waste dumps having at least one outside filter layer and one draining and/or degassing area located within the outside filter layer.

BACKGROUND

Many domes of this kind are known, which are uniformly distributed in a waste dump in a vertical or nearly vertical arrangement.

For example, a very costly dome design is disclosed in West German Offenlegungsschrift No. 36 09 973. In order to make this dome or seepage water cistern, a shaft must first be prepared with conduits in its outside wall. A filter layer is arranged around this shaft. Since the shaft must be prepared for its full height, such shafts can only be erected at very great distances from each other to avoid interference with the settling of the dumped material. West German Offenlegungsschrift DE-OS No. 36 09 973 gives no indication of the composition and type of fastening of the filter layer to the shaft. Dewatering with this prior art dome takes place through the free inside cross-section of the shaft, so that a very thick shaft wall is necessary due to the high lateral pressure load exerted by the dumped material. Therefore, a large cross-sectional area is required for this dome. This cross-sectional area is lost for the settling of the dumped material.

Another is disclosed in West German Offenlegungsschrift No. 33 06 665. To construct this known dome, a casing is first placed on the bottom of the dump and filled with filter gravel. After the dump has been filled with dumped material approximately up to the height of the casing, the latter is pulled upward approximately one length and again filled with filter gravel. Hence, the casing of this known dome must be pulled upward by one length at regular time intervals and filled again with gravel. Therefore, the manufacture of these domes is very time consuming and can only be achieved by using machines such as crane trucks, for example. Because of the very small hollow space volume of the column filled up with filter gravel, a large cross-sectional area of the dome is again necessary to ensure adequate dewatering and/or degassing. When materials are dumped that decompose at varying rates, they settle at different rates. During the decomposition time, transverse forces are created in the dumped materials that cause the dome, which consists of loosely piled filter gravel, to shift. Due to the shifting of the filter gravel layers, there is no longer a reliable draining and/or deaeration, or the cross-sectional area of the filter gravel must be made so large that, even if the filter gravel layers shift, draining and/or degassing is still ensured. Here again, valuable space that would otherwise be available for the dumped material is used up.

SUMMARY OF THE INVENTION

An object of the present invention is to provide domes for waste dumps of the type mentioned above that can be made easily and without great expense and that also require the smallest possible cross-sectional area to satisfy their dewatering and/or degassing function.

This and other objects are achieved, according to the invention, by forming the draining and/or degassing area by means of at least one shaped body of plastic material that has a hollow space volume of at least 70% and by mounting in the shaped body a continuous supporting tube having a length that corresponds to the height of the dome.

BRIEF DESCRIPTION OF THE DRAWINGS

The invention will now be described more fully with reference to the accompanying figures, in which.

DETAILED DESCRIPTION OF PREFERRED EMBODIMENTS OF THE INVENTION

Figure 1:
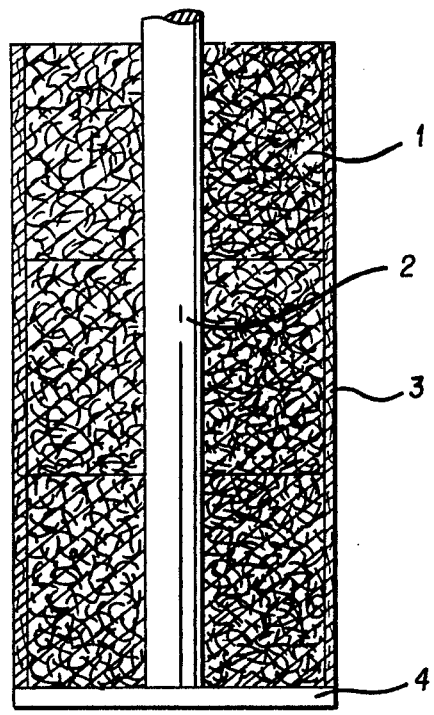
FIG. 1 is a longitudinal section through a dome embodying the invention.

The kind of shaped bodies mentioned in the Summary, above, has been known for a long time as draining shapes. For example, they consist of three-dimensionally molded panels of plastic material or of a multitude of intersecting filaments arranged in loops and made of melt-spun polymers with a filament diameter of at least 0.1 mm joined together at their points of intersection. As an example, these shaped bodies can be made as taught by West German Offenlegungsschrift No. 18 10 921, according to which the filaments emerging from the spinneret are guided through an external cylinder on striking the surface of the water, resulting in a cylindrical shape of the molded body. By conically reducing the free cross-sectional surface of the external cylinder in the neighborhood of the water bath surface, these filaments can be caused to accumulate more densely within the marginal zone of the shaped body, leading to the formation of a filter layer by virtue of this concentration. Furthermore, an additional cylinder can be provided in the center of the external cylinder to produce an internal void in the shaped body. A hollow cylindrical shape results that can be slipped easily over the supporting tube in order to produce a dome. Since a shaped body produced in this fashion has a very large hollow space volume, a much smaller cross section is needed for dome production if such a shaped body is employed. It has also been found that an adequate pressure resistance of the shaped body can be achieved merely by choosing the manufacturing conditions and by choosing the diameter of the filaments forming the shaped body.

Although shaped bodies of this type have been known for a long time, they have heretofore not been used for making domes for waste dumps, because it was assumed that these shaped bodies were unstable and were therefore unsuited for this purpose.

By virtue of the combination of such shaped bodies with a supporting tube inserted therein, and which is very easy to accomplish in theory, the stability of the domes and, hence, a continuous draining and/or degassing area are ensured. Because of the high porosity of the shaped bodies, the volume of interstices can easily be pressed together by the dumped material. Despite this reduction in volume, there is still enough porosity for draining and/or degassing purposes.

Within the meaning of the present invention, the term "supporting tube" refers to those types of supporting tubes that, despite the accumulation of transverse forces created by the dumped material and acting on the dome, ensure that the shaped bodies are kept in an arrangement that passes vertically through the dumped material. The supporting tubes can be made of solid or hollow material and must effectively prevent the lateral displacement of individual segments of the shaped bodies. In addition, the supporting tubes must be able to withstand the pressures exerted by the dumped material on the shaped bodies.

This combination of a supporting tube and shaped body makes it possible to simplify considerably the production of domes for waste dumps in situ and to adjust them to the filling pattern of the dump without creating problems when adding more material to the waste dump.

Advantageously, the supporting tube is composed of a plurality of interconnected tubes. In this way, the supporting tube can be extended in simple fashion in accordance with the level to which the dump has already been filled with material. The supporting tubes can be interconnected, for example, by sleeves, screw connections, etc.

To ensure a secure footing for the supporting tube, the latter may be coupled to a base plate.

It has also proved advantageous to build the filter layer using filaments made of polymers. A fleece of this kind can have its strength characteristics adjusted to suit the specific application. The use of polymer filaments enables one to take account of the requirements relative to the resistance to decomposition.

In another version of the dome of the invention, the shaped body is made up of several telescoping tubular cylinders. A surprising finding was that the telescoping of several hollow cylindrical shapes can increase the pressure resistance of the shape as a whole. The telescoping of several hollow cylindrical bodies also makes it possible to provide an additional filter layer between adjacent cylinders, so that filtration still occurs even if the external filter layer is damaged. Circular, elliptical, rectangular, square and other cross-sectional shapes may be used for the hollow cylindrical shapes.

In an especially preferred embodiment, the shaped body comprises a rolled-up mat comprising a multitude of filaments of melt-spun polymers arranged in loops and intersecting with each other. The filaments have a diameter of at least 0.1 millimeter and are bonded together at their points of intersection. Mats of this kind are, for example, taught by West German Offenlegungsschrift No. 18 10 921 or as highly pressure-resistant mats as taught by West German Offenlegungsschrift Nos. 25 30 499 or 27 20 403, and are available on the market already rolled up. Mats rolled up in this fashion, which have the external shape of a roll, need only be slipped over the supporting tube to build the dome. A surprising finding was that the use of the rolled-up mats known from the prior art makes dome production in a very simple fashion possible, simply by providing the rolled-up mats with a supporting tube.

In this case, it has been found advantageous for the mat to be covered on at least one side with a filter fleece. In this way, even if several outside filter layers are damaged by dumped material that, for example, has sharp edges, dewatering and/or degassing can still be accomplished.

To increase the pressure resistance of the shaped bodies used in accordance with the teaching of the invention for making domes, pressure-resistant grains can be incorporated into the shape. For example, expanded clay, gravel or the like can be used as the pressure-resistant grains. These pressure-resistant grains serve merely as spacers, so that only a small amount of grains is required. The grains can be embedded in simple fashion in a mat as taught by West German Offenlegungsschrift No. 25 30 499, because the mat described therein has a humped structure into whose intervening spaces the grains can be inserted. In this case, it is unnecessary to embed grains in each void.

In order to provide as much space as possible for the dumped material, it is advantageous to give the dome a cross-sectional area that decreases from the bottom to the top. When using rolled-up mats, this can be accomplished in simple fashion by using rolled-up mats that have fewer turns in the upper areas than in the lower areas.

Within the meaning of the invention, the term "waste dump" also means "disposal basin" (an artificially created open air basin with dewatering domes) and accumulations of slush or the like for silting coastal areas.

Figure 2:
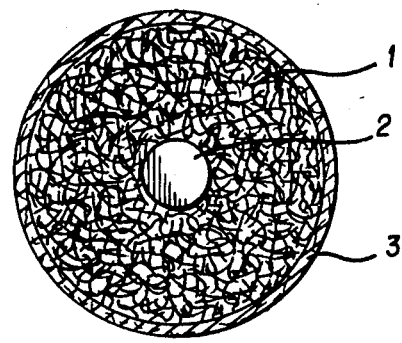
FIG. 2 is a top plan view of the dome in FIG. 1.
Figure 3:
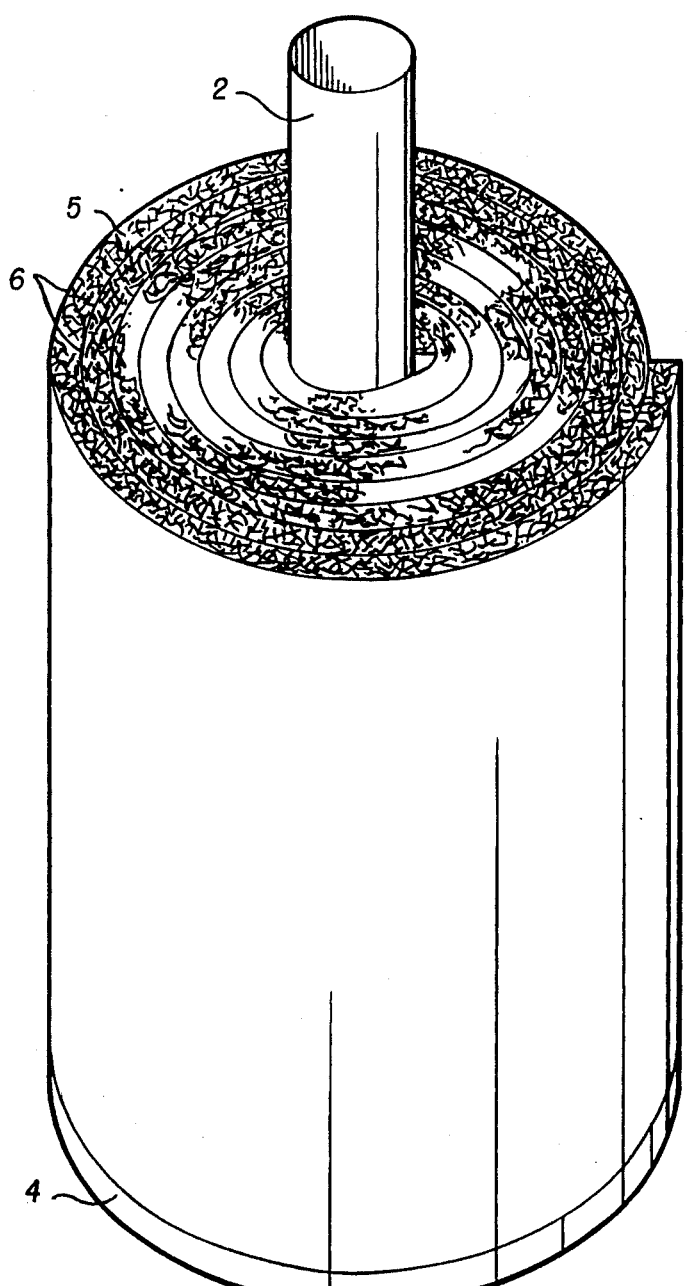
FIG. 3 is a perspective view of another dome incorporating the invention.

In FIGS. 1 and 2, the draining and/or degassing area is designated 1. It consists of a shaped body composed of a multitude of filaments arranged in loops and intersecting each other, the filaments preferably being made of melt-spun polymers with a filament diameter of at least 0.1 mm, and being bonded together at the points of intersection. Several shaped bodies 1, three of which are shown in FIG. 1, are slid one after the other onto a supporting tube 2. The shaped bodies are covered on the outside by a filter layer, for example, a fleece 3. To improve its stability, the supporting tube 2 is coupled to a base plate 4. In FIG. 3, the dome shown therein again has a supporting tube 2 and a base plate 4 coupled thereto. The draining and/or degassing area in this case consists of a mat 5 wound around the supporting tube and covered on one side with a fleece 6. Grains 7 can be embedded in the mat 5, but only a portion of the grains 7 are shown in FIG. 3 for clarity. Mat 5 itself is comprised of a multitude of fibers arranged in loops and intersecting each other, made of melt-spun polymer fibers bonded together at their points of intersection. Mats of this kind are commercially available in the rolled-up form shown and can be slid without further ado over the supporting tube. Supporting tube 2 can be extended by coupling, for example, by a threaded sleeve, and additional rolled-up mats 5/6 can be slid on. This process can be repeated until the dome reaches the top of the waste dump.

Figure 4:
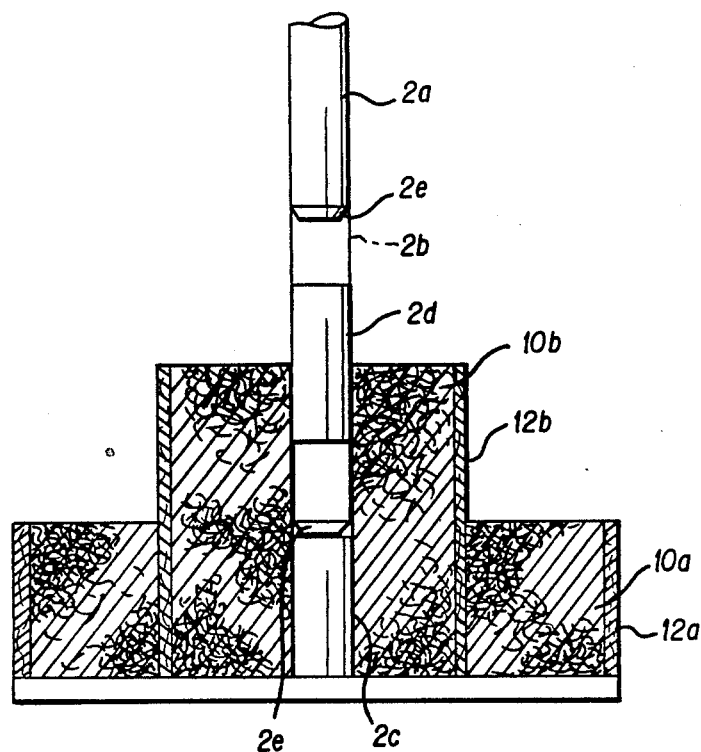
FIG. 4 is a longitudinal section through another dome incorporating the invention.
Figure 5:
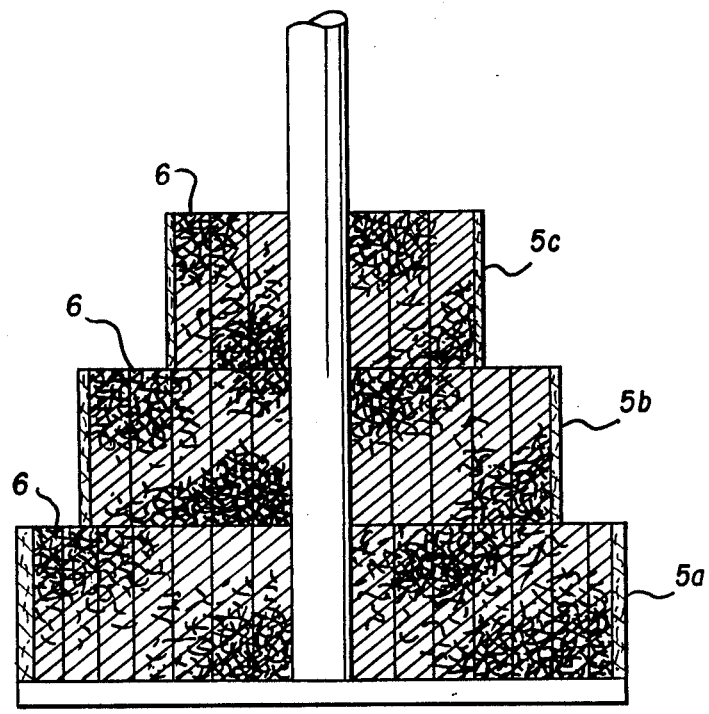
FIG. 5 is a longitudinal section through a further dome incorporating the invention.

FIGS. 4 and 5 illustrate other aspects of the invention. In FIG. 4, several supporting tubes 2a, 2b, and 2c are interconnected by a sleeve 2d or a threaded connection 2e. The shaped bodies in FIG. 4 are made up of several telescoping tubular cylinders, two of which 10a, 10b are illustrated in FIG. 4. The tubular cylinders 10a, 10b are separated by a filter layer 12b. An additional filter layer 12a is provided on the outer surface of tubular cylinder 10a. FIG. 5 illustrates a tapered dome including three wound mats 5a, 5b and 5c. The number of turns in the upper mat 5c is fewer than the turns in the middle mat 5b, and the number of turns in the middle mat 5b is fewer than the turns in the lower mat 5a. Each turn is separated by a fleece 6.

It will be understood that a large number of such domes may be placed in a dump, and the distance between adjacent domes must be so selected that the dumped material can be dewatered or degassed with a high degree of reliability. For dewatering or degassing, the domes may be interconnected by cross tubes both in the top and in the bottom areas.

What is claimed is:

1. A dome for a waste dump, comprising at least one outside filter layer and one draining and/or degassing area disposed within the outside filter layer, said draining and/or degassing area comprising at least one shaped body of plastic material which has a hollow space volume of at least 70%, and a continuous supporting tube means for maintaining said shaped body in a substantially vertical arrangement despite formulation of transverse forces created by dumped material and acting on the dome, said continuous supporting tube means being disposed within said at least one shaped body and having a length corresponding to a height of the dome, said continuous supporting tube means comprising a plurality of tubes interconnected end-to-end in series whereby the supporting tube means can be extended in accordance with the level of the dumped material.

2. The dome as set forth in claim 1, wherein said at least one shaped body is comprised of a plurality of three-dimensionally molded panels of plastic material.

3. The dome as set forth in claim 1, wherein said at least one shaped body is comprised of a multitude of intersecting filaments of melt-spun polymers arranged in loops and having a filament diameter of at least 0.1 mm, said filaments being interconnected at points of intersection between said filaments.

4. The dome as set forth in claim 1, wherein the supporting tube means is coupled to a base plate.

5. The dome as set forth in claim 1, wherein the filter layer is a fleece composed of polymer filaments or fibers.

6. The dome as set forth in claim 1, wherein said at least one shaped body is comprised of a plurality of telescoping tubular cylinders.

7. The dome as set forth in claim 6, wherein a filter layer is arranged at least between an external said cylinder and a radially inwardly adjacent said cylinder.

8. The dome as set forth in claim 1, wherein said at least one shaped body is comprised of a rolled-up mat.

9. The dome as set forth in claim 8, wherein said mat is covered with a filter fleece at least on one side of said mat.

10. The dome as set forth in claim 1, wherein said at least one shaped body contains pressure-resistant grains.

11. The dome as set forth in claim 1, wherein the dome has a cross-sectional surface area which decreases from bottom to top of said dome.

* * * * *

UNITED STATES PATENT AND TRADEMARK OFFICE
CERTIFICATE OF CORRECTION

PATENT NO. : 4,946,310
DATED : August 7, 1990
INVENTOR(S) : Wilfried WUNDERATZKE It is certified that error appears in the above-identified patent and that said Letters Patent is hereby corrected as shown below:

Claim 1, line 8, change "formulation" to --accumulation--.

Signed and Sealed this

Seventh Day of January, 1992

Attest:

HARRY F. MANBECK, JR.

*Attesting Officer*  *Commissioner of Patents and Trademarks*